United States Patent [19]

Ciongoli

[11] Patent Number: 4,692,878
[45] Date of Patent: Sep. 8, 1987

[54] THREE-DIMENSIONAL SPATIAL IMAGE SYSTEM

[75] Inventor: Bernard M. Ciongoli, Totowa, N.J.

[73] Assignee: Ampower Technologies, Inc., Totowa, N.J.

[21] Appl. No.: 717,796

[22] Filed: Mar. 29, 1985

[51] Int. Cl.⁴ .................. G06F 15/40; G09G 3/20; G06K 9/42
[52] U.S. Cl. .................. 364/518; 340/755; 340/795; 382/47
[58] Field of Search ........ 364/518, 521; 340/703, 340/720, 755, 729, 794, 795; 382/47; 358/88–90

[56] References Cited

U.S. PATENT DOCUMENTS

| | | | |
|---|---|---|---|
| 3,140,415 | 7/1964 | Ketchpel | 340/755 X |
| 3,493,290 | 2/1970 | Traub | 358/88 X |
| 4,099,172 | 7/1978 | Montanari et al. | 340/755 X |
| 4,130,832 | 12/1978 | Sher | 340/755 X |
| 4,160,973 | 7/1979 | Berlin, Jr. | 340/755 X |
| 4,259,725 | 3/1981 | Andrews et al. | 364/521 |
| 4,340,888 | 7/1982 | Seroskie | 340/755 |
| 4,484,219 | 11/1984 | Kirk | 358/90 |
| 4,532,602 | 7/1985 | DuVall | 364/518 X |
| 4,607,255 | 8/1986 | Fuchs et al. | 340/755 |

OTHER PUBLICATIONS

Fisher, R. C., "Vibrating Display Unit", *IBM Tech. Discl. Bulletin*, vol. 22, No. 1, Jun. 1979, pp. 6–8.

Primary Examiner—Errol A. Krass
Assistant Examiner—Joseph L. Dixon
Attorney, Agent, or Firm—Michael Ebert

[57] ABSTRACT

A system in which a three-dimensional image of an object is stored in a data input device in the form of a family of points each defined by digital data representing the x-y-z Cartesian coordinates of the point. Digital signals derived from the data input device are applied through a digital interface to an electronic display on whose face is presented a two-dimensional image of the object constituted by pixels, the positions of which correspond to the x-y coordinates in the family of points. The interface functions to selectively activate each pixel to render it luminous. The selectively-activated luminous pixels are projected into a model space by a lens which is driven to rotate at a constant rate on an axle that is normal to the optical axis of the lens and is parallel to the display face whereby the angle of the lens relative to the face undergoes continuous change. Associated with the driven lens is a sensor that yields a reference pulse each time the lens is at a predetermined angle in the course of a revolution. The interface acts in response to the reference pulse to compute the changing angles assumed by the lens in the course of each revolution to produce lens-angle signals, and the interface processes the x-y-z digital data signals received from the input device in relation to the computed lens-angle signals to cause activation of the related pixel in the display at the instant at which the lens angle is such as to project a luminous dot or dixel in the model space at a location in accordance with the z-coordinate whereby rotation on the lens results in a family of luminous dixels in the model space to create a three-dimensional spatial image of the stored object.

10 Claims, 7 Drawing Figures

THREE-DIMENSIONAL SPATIAL IMAGE SYSTEM

BACKGROUND OF INVENTION

1. Field of Invention:

This invention relates generally to stereoscopic or three-dimensional displays, and more particularly to a system in which a three-dimensional image stored in a memory in terms of digital data is transformed into a three-dimensional spatial image.

2. State of Prior Art:

The operation of a two-dimensional electronic display for converting signals into visual imagery in real time depends on its ability to turn individual picture elements "ON" and "OFF" at a rapid rate. In an electronic display, the smallest controllable element is the pixel. Typically a high resolution, two-dimensional electronic display will have a quarter million pixels in an X-Y array, each being individually controllable to create a two-dimensional image whose pattern is defined by the activated pixels.

The concept of pixels operating in a flat panel display constituted by a matrix of LED's or other light-emitting elements has been extended to analog-raster-scan cathode ray tube (CRT) displays in which an electron beam is deflected to sweep across the phosphor face of the tube and thereby produce a luminous line. By digitally modulating the beam, one can then produce a linear string of illuminated dots, each corresponding to a pixel. Such pixels are created in all of the rows of the CRT raster. By varying the beam intensity, one can turn each pixel on and off or change its intensity.

There are various computer-aided systems which electronically store image data. Thus in computer-aided design (CAD), the computer functions to perform design calculations for determining optimum shape and size for a variety of applications ranging from three-dimensional mechanical structures to maps of huge areas.

By way of example, we shall consider computerized tomography or the CAT, which is an imaging technique in which the X-ray scanning beam of a computer-controlled X-ray scanner passes through the body of a patient and is collected by an array of detectors. The beam is rotated to produce a cross-sectional tomogram or slice through the body region of interest. By incrementally advancing the body relative to the X-ray scanner, a series of slices can be obtained.

The X-ray information collected through this rotary X-ray action is then used by the computer to reconstruct the internal structure. The resultant digital image is displayed on a CRT screen or recorded on film. In practice, the series of tomograms or slices may be sequentially displayed or recorded.

As pointed out in the 1984 Iwasaki U.S. Pat. No. 4,472,737, a diagnosis may be carried out by a doctor by observing the individual tomographs as they are sequentially displayed. But the doctor cannot actually see the internal structure in three dimensions. Thus, when tomographing a tumor in the head of a patient at a series of slice positions, the state of the tumor at each slice can be observed. However, the tumor as a whole cannot be viewed stereographically.

In this situation, the doctor, by exercising his imagination, and by observing several individual tomograms in sequence, can effectively combine these tomograms into a single stereographic image. Or the doctor, by observing tomograms taken at different angles spaced at proper angular intervals, can mentally synthesize the resultant slices to construct a single stereo image of the tumor. Thus the CAT provides individual two-dimensional tomograms which a skilled doctor can intellectually construct into a stereo image.

As Iwasaki recognizes, it is advantageous to present the doctor with an actual three-dimensional image in a computer-aided tomographic system. To this end, Iwasaki makes use of a digital memory to store tomographic picture data of several slices of the region of interest. This picture data is read out in sequence and at given time intervals on a cathode ray tube terminal. Interposed between the eye of the observer and the CRT screen are parallel liquid-crystal reproducer units. The reproducer units are sequentially actuated in synchronism with the CRT display so that each unit exhibits a respective slice. These reproduced slices are viewed in superposed relation to provide a stereo image of the region of interest.

The three-dimensional display disclosed in the 1977 Berlin U.S. Pat. No. 4,160,973 assigned to M.I.T. is interfaced with a computer to provide three-dimensional X-ray information in the medical field. The 3-D arrangement is also useful for nondestructive testing and in the field of computer-aided design. In the Berlin patent, an electronic two-dimensional display is provided, the display being constituted by a planar matrix of LEDs which are selectively activated by digital data derived from a computer to produce a two-dimensional image. The two-dimensional display is rotated while the LEDs are modulated to produce a three-dimensional image.

In the three-dimensional display disclosed in the 1984 Thomason et al. U.S. Pat. No. 4,462,044, a two-dimensional image is produced on the face of a cathode ray tube. An observer sees a reflection of this CRT image on the face of a vibrating mirror which is maintained in sinusoidal vibration. As the mirror vibrates through concave and convex positions, the image on the CRT screen appears closer and farther away from the observer with the apparent depth range being dependent on the amplitude of mirror vibrations.

Another 3-D approach to diagnostic imaging is that taken by Mezrich et al., U.S. Pat. No. 4,297,009, in which film transparencies of the cross-sectional slices of a given organ are mounted at sequential positions on a rotating disc, the images being intermittently illuminated to provide a 3-D display.

In the 3-D display disclosed in the Fajans U.S. Pat. No. 4,315,280, the information displayed is derived from a radar system which tracks an airplane and yields information which gives the plane location in space in x-y-z coordinates. Associated with the radar system is a cathode ray display terminal which produces a luminous spot at a position which is determined by the x-y coordinates of the airplane.

This luminous spot is projected into space by a rotating lens. The display is under computer control so as to render the spot luminous only when the lens is so oriented as to project the spot in space at a Z position corresponding to the instantaneous z position of the aircraft. The Fajans patent, therefore, does not provide three-dimensional images of the objects, but only a luminous spot in space whose x-y-z location is indicative of the instantaneous coordinates of the moving aircraft.

In the Fajans system, a potentiometer is operatively coupled to the rotating lens to provide an analog voltage indicative of th instantaneous angle of the lens. This mechanical arrangement has practical drawbacks, among which is the fact that the analog voltage must be converted into a digital value for processing in a computer.

SUMMARY OF INVENTION

In view of the foregoing, the main object of the invention is to provide a stereoscopic system in which an electronically stored three-dimensional image is transformed into a three-dimensional spatial image in a model space in front of a viewer.

A significant advantage of the invention is that the spatial images are viewable with the naked eye without the need for special eyeglasses or other expedients. Moreover, the system is relatively simple, involving a minimum number of mechanical components.

Also an object of the invention is to provide a system of the above type in which a three-dixx:nsional image of an object is stored in terms of digital data which identifies the location of each point of the image in terms of its x-y-z coordinates, other attributes of the image such as its color, brightness and shading also being digitally stored and being reproduced in the spatial image.

A salient feature of a system in accordance with the invention is that it makes use of a lens rotating at a constant rate, the instantaneous angle of which is computed without the need for a rotating potentiometer or other moving parts.

Yet another object of the invention is to provide a 3-D system having an interactive capability making it possible for the viewer to manipulate and displace the spatial image in various ways.

Briefly stated, these objects are attained in a system in which a three-dimensional image of an object is stored in a data input device in the form of a family of points each defined by digital data representing the x-y-z Cartesian coordinates of the point. Digital signals derived from the data input device are applied through a digital interface to an electronic display on whose face is presented a two-dimensional image of the object constituted by pixels, the positions of which correspond to the x-y coordinates in the family of points. The interface functions to selectively activate each pixel to render it luminous. The selectively-activated luminous pixels are projected into a model space by a lens which is driven to rotate at a constant rate on an axle that is normal to the optical axis of the lens and is parallel to the display face whereby the angle of the lens relative to the face undergoes continuous change. Associated with the driven lens is a sensor that yields a reference pulse each time the lens is at a predetermined angle in the course of a revolution. The interface acts in response to the reference pulse to compute the changing angles assumed by the lens in the course of each revolution to produce lens-angle signals, and the interface processes the x-y-z digital data signals received from the input device in relation to the computed lens-angle signals to cause activation of the related pixel in the display at the instant at which the lens angle is such as to project a luminous dot or dixel in the model space at a location in accordance with the z-coordinate whereby rotation on the lens results in a family of luminous dixels in the model space to create a three-dimensional spatial image of the stored object.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a rotating lens arrangement explanatory of the basic concept underlying the invention;

Figure 4:
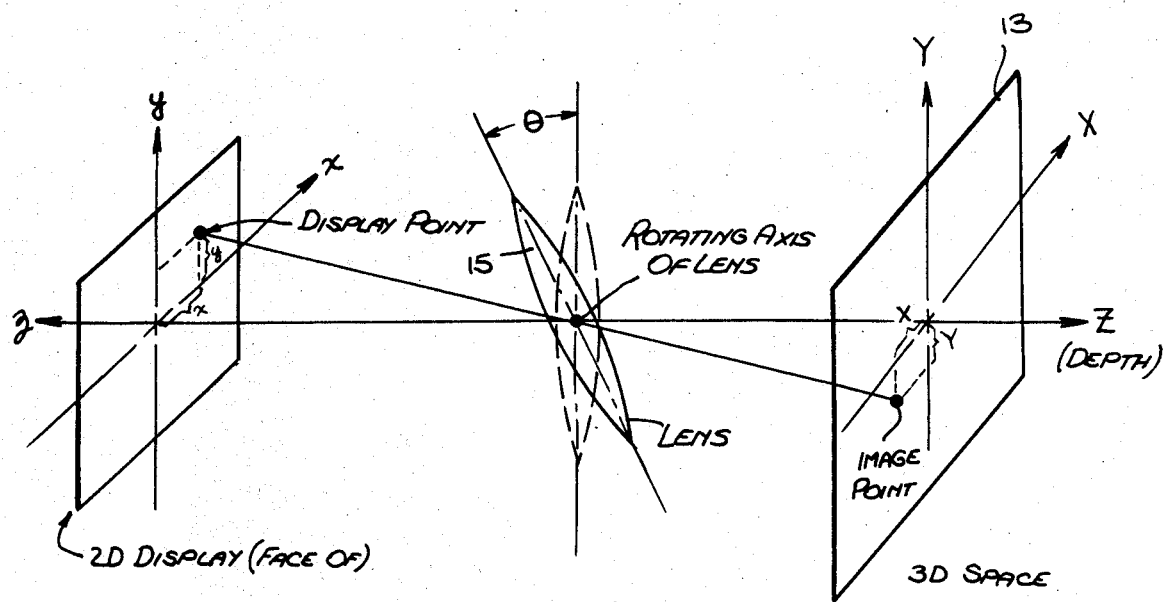
Figure 5:
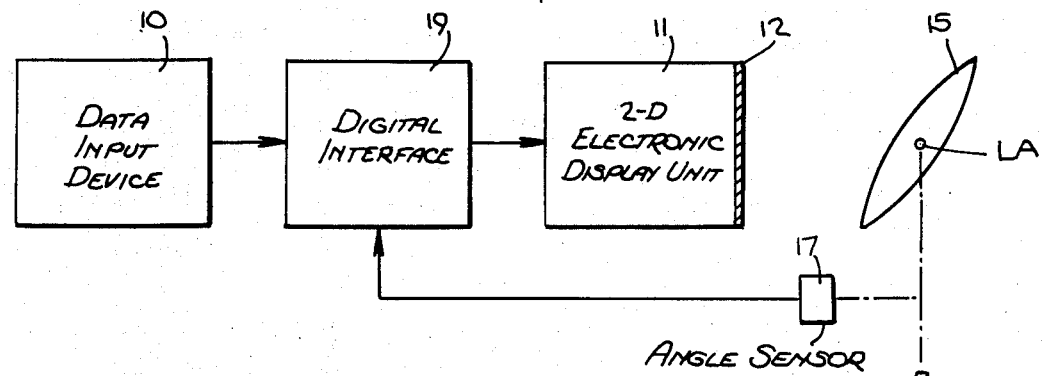
Figure 6:
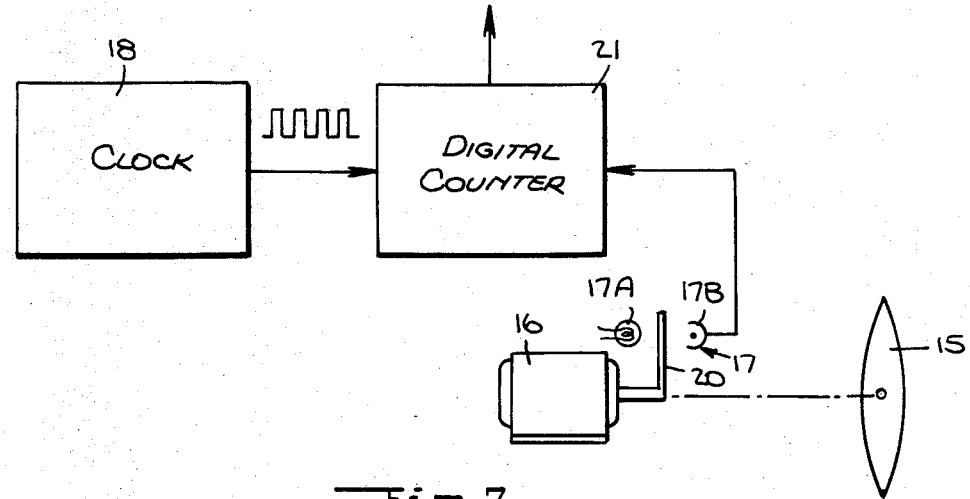
Figure 7:
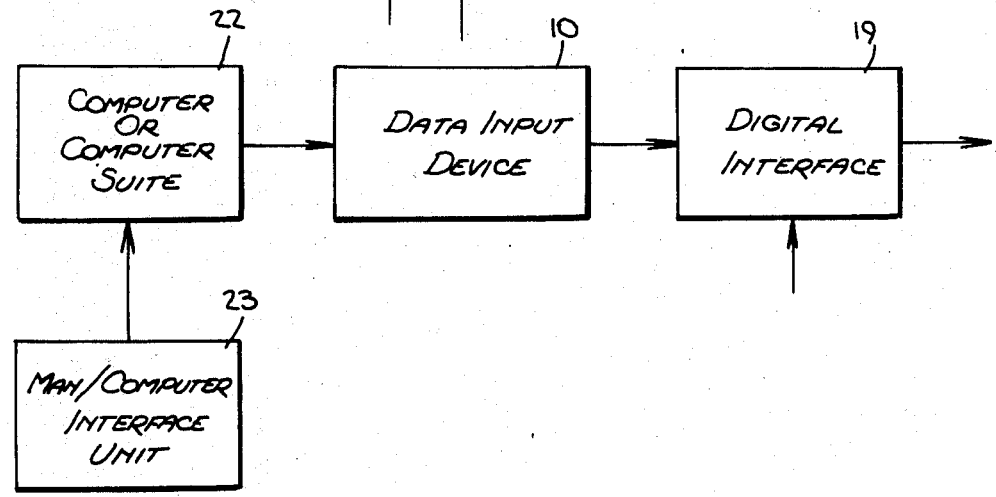

FIG. 4 schematically illustrates the relationship of the rotating lens to the face of the 2-D display to 3-D space;

FIG. 5 is a block diagram of a first embodiment of a 3-D spatial image system in accordance with the invention;

FIG. 6 is a block diagram of the means for obtaining a lens angle digital signal; and FIG. 7 shows other embodiments of a 3-D spatial image system in accordance with the invention.

DESCRIPTION OF INVENTION

The Basic Concept:

In a system according to the invention, stored in the memory of a data input device 10 is an image of a three-dimensional object. This image is expressed in digital terms, for any three-dimensional object is composed of a family of points in a configuration which defines the contours of the object. The location of each point is represented by digital data indicative of its location in x-y-z Cartesian coordinates, z being the depth dimension.

The stored 3-D input data in the case of a CAT scan may be that of a physical tumor. In the case of a computer-aided design system, the stored data may represent a three-dimensional geometric form. The invention is applicable to any instrument capable of defining a three-dimensional object in terms of a family of points whose respective locations are digitally expressed in Cartesian coordinates which are stored in a digital memory and which can be read out to provide digital data signals.

These digital signals are applied to a two-dimensional electronic display unit 11 to present on the face 12 thereof a two-dimensional illuminated image of the stored three-dimensional object. This display may be a flat panel monochrome display formed by a matrix of LEDs or other light-emitting elements, each providing a pixel, or it may take the form of a CRT raster scan display using a mask color technique for a chromatic or black-and-white display. This arrangement is shown in FIG. 1.

Figure 2:
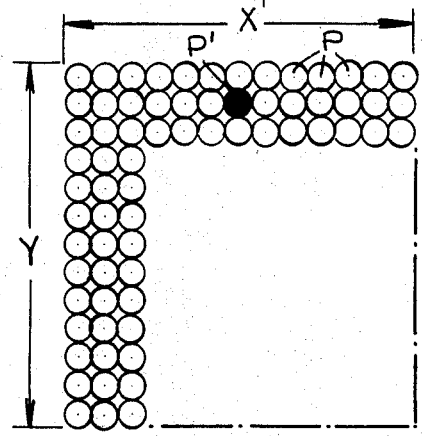
FIG. 2 illustrates the face of a standard 3-D electronic display formed by an x-y array of pixels.

As shown in FIG. 2, the two-dimensional electronic display is created by an x-y array of pixels P which are selectively rendered luminous or caused to flash to define the image. In FIG. 2, for purposes of explanation, only pixel P' is rendered luminous, all others being "off." The activated pixel P' has an X-Y position on the face 12 of the display which corresponds to the x-y position of the related point in the family thereof forming the stored 3-D image of the object. Absent in this 2-D display is the z or depth dimension of this point.

The z-dimension of the point represented by pixel P' is imparted thereto in a model space 13 in front of a viewer represented by his eye 14 by activating or flashing pixel P' at the proper lens angle. The activated pixel P' is projected into this model space by a bi-convex lens 15 which is disposed between the face 11 of the display and model space 13. Lens 15 is mounted for rotation on an axle LA which is parallel to the face 12 of the display and is normal to the optical axis OA of the lens.

Figure 1:
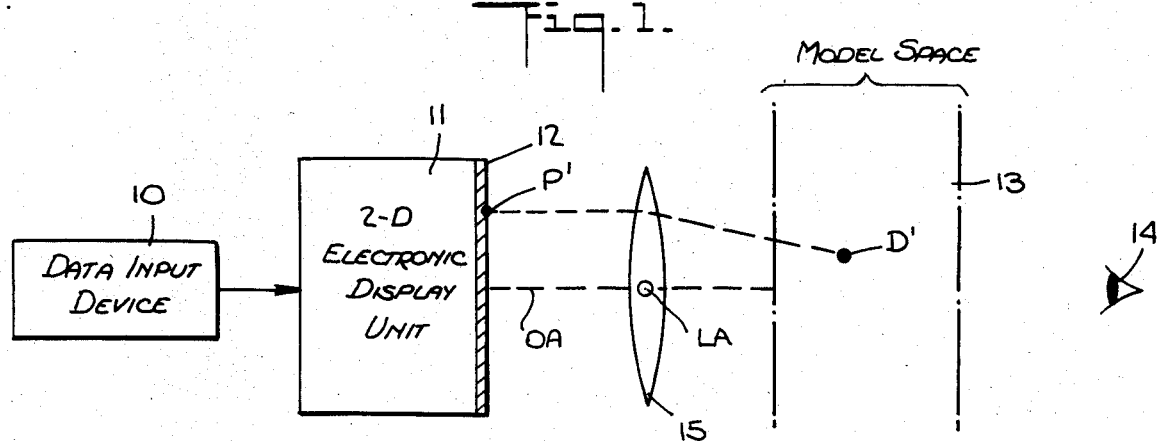

Lens 15 is rotated at a constant rate so that in each cycle of rotation, the angle of the lens makes with respect to the face undergoes a continuous change, beginning with a zero angle, as shown in FIG. 1. When lens 10 is at a zero angle, it will focus the light rays emitted by pixel P' at a point in model space 13 represented by luminous dot D'. This luminous dot will hereinafter be referred to as a "dixel" to distinguish it from a pixel formed on the face of the electronic display.

Figure 3:
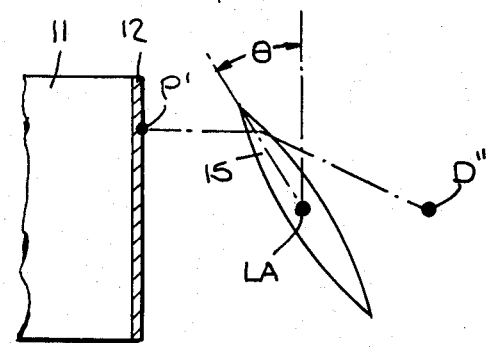
FIG. 3 shows the lens in FIG. 1 at an angle to the face of the electronic display.

In this example, we have assumed that pixel P' is activated and thereby caused to flash at the instant at which lens 15 is at a zero angle. If, however, as shown in FIG. 3, pixel P' flashes at the instant lens 15 is inclined by an angle $\theta$ with respect to the face of the display, then pixel P' will be projected to a different location in model space represented by dixel D''.

Thus, the position in space occupied by the dixel depends on the X-Y position of the pixel on the face of the display and the angular position of lens 15 at the instant the pixel is activated which determines the Z position of the resultant dixel in space.

If a two-dimensional luminous image of the stored object is flashed on the face of the two-dimensional display 12 by simultaneously or almost simultaneously activating those pixels necessary to create this image, and the lens 15 then occupies a fixed zero angle position, then a two-dimensional image would be projected in the model space without any depth.

If, however, the lens is continuously rotating and a two-dimensional planar image of the object is formed on the face of the display by selectively activating the pixels necessary to create this display, one can by properly timing the activation of each pixel cause it to flash at that instant at which the lens is at an angle which projects the activated pixel into the model space to produce a dixel at a location in accordance with the z-position of the corresponding point in the family of points representing the stored three-dimensional object. In this way, the luminous image in space will then be composed of a family of dixels to create a three-dimensional spatial image corresponding to the stored three-dimensional image. This three-dimensional spatial image is viewable by the naked eye without the need for special glasses or any other expedient.

The equations which describe the x-y positions and flash times ($\Delta t$) required to convert a family of 3-D display points into 3-D space is presented in Table I below in conjunction with FIG. 4. It is to be noted that the solution of these equations explicitly for each and every 3-D point (X-Y-Z) to derive x, y $\Delta t$ is not a requirement for this invention to be practical.

The relationship between 3-D dixel locations and 2-D pixel locations and the corresponding $\Delta t$ (flash time) for each pixel can be easily and accurately approximated empirically by measuring the extreme location at which dixels appear in 3-D space with respect to maximum/minimum x, y pixel locations at maximum/minimum viewable $\Delta t$'s and interpolating the remaining pixel locations (x-y), and flash time ($\Delta t$), versus the corresponding dixel location (X, Y and Z or depth). Only the 8 extreme pixel and corresponding dixel point locations need be measured. The remaining tens of thousand of pixel/dixel relationships can be interpolated by a calibration procedure or computer program.

Table I $X = f(x/L)$ $Y = f(y/L)$ $Z = f(z/L)$ $L = Z \cos(\theta - Y) \sin(\theta - f)$ $\Delta t = \theta/r$ or $\theta = r(\Delta t)$ where:
f = focal length of lens 15
$\theta$ = angle of lens measured from a plane parallel to face of 2-D display
r = rate at which lens rotates about its axis
x, y = coordinates of a pixel on face of 2-D display
$\Delta t$ = corresponding flash time of pixel of interest
X, Y, Z = coordinates of a dixel in 3-D space The System:

As illustrated in FIG. 5, in one preferred embodiment of a system in accordance with the invention, a lens 15 is provided which is optically associated with the face 12 of the 2-D electronic display unit 11. Lens 15 is rotated at a constant rate by a motor 16 operatively coupled to shaft LA of the lens which, in practice, may be a simple, thin and symmetrical biconvex lens. Or a more complex lens structure may be used to minimize optical aberrations.

Motor 16 operates at high speed at a constant rate; and by way of example, we shall assume that the motor speed is 600 RPM. Motor 16 is associated with a lens sensor 17 which generates an interrupt pulse each time the rotating lens traverses a predetermined angular reference position which in practice may be zero degrees. The resultant interrupt pulses whose repetition rate corresponds to the rate of lens rotation are supplied to a digital interface 19 that couples the data input device 10 to the 2-D electronic display unit 11.

Digital interface 19 is constituted by a microcomputer and it is programmed to act in response to the interrupt pulses from lens sensor 17 to compute the instantaneous angles assumed by the lens in the course of each full revolution thereof to provide lens-angle digital signals.

One form of interface arrangement suitable for this purpose is shown in FIG. 6, where it will be seen that sensor 17 is of the photoelectric type and is constituted by a light source 17A whose projected light beam is detected by a photodetector 17B, which may be a solid state device. Mounted eccentrically on the shaft of motor 16 which drives lens 15 is a shutter element 20. The shutter element is so placed with respect to sensors 17A-B, that when the driven lens 15 is at zero degrees, shutter element 20 then intercepts the light beam to produce in the output of photodetector 17B an interrupt pulse. One such pulse is produced at the start of each lens revolution at zero degrees.

The interrupt pulse is applied as a reset pulse to a digital counter 21; and each time an interrupt pulse is received, the counter is reset to resume counting. Fed into the input of counter 21 are clock pulses yielded by an internal clock 18 in the interface 19. This clock may take the form of a quartz-crystal oscillator functioning as a time base to generate periodic clock pulses at a high frequency rate.

In the example given, lens 15 rotates at 600 RPM; hence it completes a full revolution during each 1/10th second interval. Since the interrupt pulse acts to reset counter 21 at the start of this interval, the counter then proceeds to count the clock pulses fed thereto during the interval. The greater the lens angle at any instant in the course of the revolution which takes place during this interval, the greater the count. Thus, digital counter 21 yields lens-angle digital signals and the only moving components of the system are the motor and the lens driven thereby.

Data input device 10 has stored therein in digital terms the x-y-z coordinates of each point in the family of points defining the configuration of a three-dimensional object. The data digital signals transmitted by input device 10 are supplied to interface 19.

Digital interface 19 is programmed to process the x-y-z digital data representing each point in the family thereof supplied thereto by data input device 10 in relation to the computed lens angle data derived from sensor 17 in the manner previously described or in any other manner dictated by the microcomputer program.

Interface 19 acts to trigger the electronic display to flash the related pixel which represents the x-y coordinates of this point at the instant at which the angle of lens 15 is such as to project the luminous pixel to a dixel position in space in accordance with the Z or depth dimension of this point.

This interface action is carried out sequentially with respect to all of the pixels representing points in the family thereof which constitute the stored 3-D image. Thus projected into the model space by rotating lens 15 is a family of dixels which together create a 3-D spatial image. The rate of lens rotation is such that, due to the phenomenon of visual persistance, one sees not the individual dixels, but a 3-D image.

Where the stored digital data includes other attributes of the stored 3-D image of an object, such as its coloration, brightness, shading, etc., these are reproduced in the 2-D electronic display as in a conventional color television receiver, and they are incorporated into the 3-D spatial display formed by the dixels whose color, etc., reflect these attributes.

Where the data stored in the digital memory of input data device 10 is constituted by tomographic slices of a human body region derived from X-ray CAT scan equipment, as in the case of the above-identified Iwasaki patent, then with the present invention, the digital data representing these tomographic slices can be sequentially applied by interface 19 to the 2-D display 11 and projected at high speed into the model space so that the tomograms can then be viewed by a physician in superposed relation to provide a three-dimensional spatial image of the internal body region.

And, as shown in FIG. 7, one may use a computer or computer suite 22 and associated computer-programs to transform and store digital data representing points or family of points to digital data in a form usable by the 3-D system, and to supply this data to data input device 10 which stores and transmits to the interface 19 the digital data to be displayed.

Interactive Display System:

In order to provide an interactive display system, one may further include in the FIG. 7 system a Man/Computer interface unit 23 which is linked to computer 22. This interface unit may be constituted by a manually-operated keyboard/VDU, or a joystick, a track ball, a mouse, a light pen or any combination thereof, making it possible for an operator to manipulate the image presented by the system.

Thus, the viewer, via the Man/Computer unit 23 and special computer programs, hosted and executed by the computer or computer suite 22, can command the system to rotate, magnify or shrink the 3-D image, or to move it horizontally or vertically in the model space. This interactive capability can be extended to command the system to extract and display slices of the three-dimensional object while simultaneously displaying the object in three dimensions. In this manner, a viewer can concurrently view the outer contours of the object and the interior thereof at the selected slide location.

While there have been shown and described preferred embodiments of a three-dimensional spatial image system in accordance with the invention, it will be appreciated that many changes and modifications may be made therein without, however, departing from the essential spirit thereof.

I claim:

1. A three-dimensional spatial image system comprising:

A. a data input device having stored therein a three-dimensional image of an object in the form of a family of points, each point of which is defined by digital data representing x-y-z Cartesian coordinates of that point;

B. an electronic display on whose face is presented a two-dimensional image of the object defined by activated luminous pixels whose positions correspond to the x-y Cartesian coordinates in said family of points;

C. a lens rotating at a constant rate on an axle normal to its optical axis and parallel to the display face whereby the angle of the lens relative to the face undergoes continuous change in the course of each revolution thereof, the lens projecting each of the luminous pixels into a model space in front of a viewer to produce a corresponding luminous dot at a location therein that depends on the lens angle;

D. a sensor associated with the rotating lens to produce a reference pulse each time the lens is at a predetermined angle whereby a reference pulse is produced during each revolution of the lens; and E. a digital interface connecting the data input device to said electronic display, said interface being constituted by a computer functioning in response to said reference pulse to compute the changing angles assumed by said lens in the course of each revolution to produce lens-angle digital signals and to process the x-y-z digital data signals received from the input device in relation to the lens angle digital signals to cause activation of the related pixel in the electronic display at the instant at which the lens angle is such as to project the corresponding luminous dot into the model space at a location in accordance with the z-coordinate whereby rotation of the lens results in a family of luminous dots in the model space at respective x-y-z locations therein to create a three-dimensional spatial image of the stored object.

2. A system as set forth in claim 1, wherein said electronic display is constituted by an x-y coordinate planar matrix of light-emitting diodes.

3. A system as set forth in claim 1, wherein said electronic display is constituted by a cathode ray-tube terminal.

4. A system as set forth in claim 1, wherein said lens is a bi-convex lens.

5. A system as set forth in claim 1, wherein said lens axle is operatively coupled to the shaft of a motor whose rotary speed is in excess of 500 RPM.

6. A system as set forth in claim 5, wherein said sensor is constituted by a photoelectric device projecting a light beam which is detected by a photodetector, and a shutter eccentrically mounted on the motor shaft to intercept said light beam once during each revolution of the shaft.

7. A system as set forth in claim 1, wherein said data input device has stored therein in digital form successive tomogram slides taken through an internal region of a living body, whereby the spatial image presents the internal region in three dimensions.

8. A system as set forth in claim 1, wherein said data input device has stored therein a geometric shape derived from a computer-aided design instrument.

9. A system as set forth in claim 1, further including a man/computer interface such as a keyboard, which is manually operated and is coupled to the data input device, so that the operator in conjunction with special computer programs is able to magnify or reduce in scale the three-dimensional spatial image or to otherwise interact with this image.

10. A system as set forth in claim 1, wherein said stored image points include other attributes of the stored object including color, and said other attributes are represented by the pixels related to the points.

* * * * *